July 19, 1938.   U. A. WHITAKER   2,124,479
BEARING

Filed Aug. 21, 1935

INVENTOR
*Uncas A. Whitaker*

BY *Harry S. Dumarse*

ATTORNEY

Patented July 19, 1938

2,124,479

UNITED STATES PATENT OFFICE 2,124,479

BEARING

Uncas A. Whitaker, Canton, Ohio, assignor to The Hoover Company, North Canton, Ohio, a corporation of Ohio Application August 21, 1935, Serial No. 37,103

11 Claims. (Cl. 308—36.1)

The present invention relates to bearings in general and particularly to bearings for use in small electrical motors. More specifically the invention comprises a bearing unit including an oil-circulating system.

It is an object of the invention to provide a new and improved bearing construction. Another object of the invention is to provide an improved bearing unit including a sleeve bushing, oil-retaining means and mounting means. A still further object of the invention is the provision of a unitary bearing construction in which a porous sleeve bearing is mounted in oil-retaining means, the entire unit being housed in an assembly adapted for mounting on a suitable support. Still another object is the provision of a new and improved combination bearing construction in which escaped oil from the bearing is returned by centrifugal force to the bearing lubricating means. These and other more specific objects will appear upon reading the following specification and claims and upon consideration in connection therewith of the attached drawing to which they relate.

Referring now to the drawing in which a preferred embodiment of the present invention is disclosed:

Figure 1:
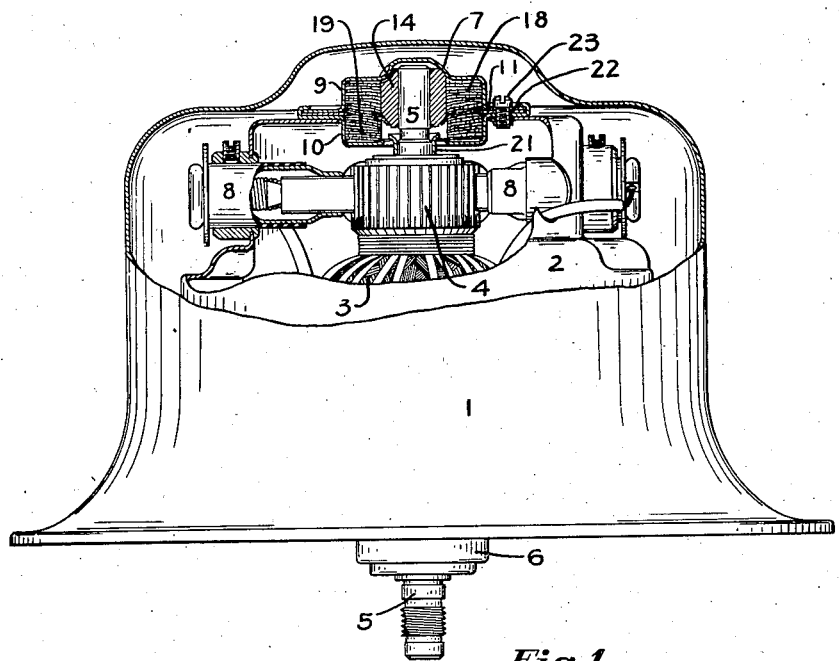
Figure 1 is a side elevation of an electrical motor with certain parts broken away and showing a bearing constructed in accordance with the present invention embodied therein.

The bearing construction in accordance with the present invention is particularly adapted for electrical motors as illustrated in the drawing. The motor is seen to comprise an outer casing 1 within which is positioned a motor frame 2. The motor armature 3, including a commutator 4 and rotating shaft 5, is rotatably mounted in a lower bearing, indicated generally by the reference character 6, and an upper bearing indicated generally by the reference character 7. Commutator brushes 8, 8 are carried by the frame 2 and cooperate with the commutator 4 in the common and well known manner. The present invention relates specifically to the upper bearings 7 and the elements which cooperate therewith.

Figure 2:
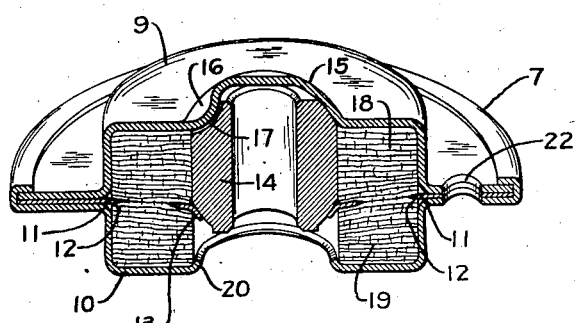
Figure 2 is an enlarged section through the bearing unit similar to the showing in Figure 1.
Figure 3:
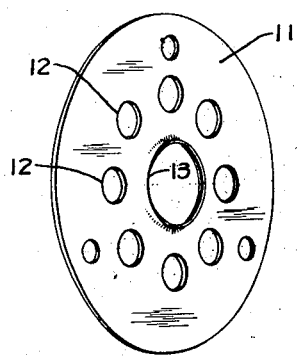
Figure 3 is a view of an element of the bearing comprising a metallic foraminous plate which supports the lower end of the sleeve bushing and divides the oil retaining means.

The bearing 7, which is shown in enlarged section in Figure 2, is seen to comprise a casing formed of an upper flanged cup 9 and a lower flanged cup 10. The flange of cup 10 is peened over the peripheral edge of the flange of cup 9 to secure the two cups in the position illustrated. A foraminous plate 11, preferably of metal, is positioned between the cups 9 and 10 with its outer margin clamped between the flanges of those cups. Plate 11 divides the housing into two parts, an upper and a lower, which are connected by apertures 12, 12, etc. Plate 11 is also formed with a central large opening 13, the boundary of which is sloped downwardly as clearly illustrated in Figure 2.

The sleeve bearing proper, which is indicated by the reference character 14, is positioned between the plate 11 and a raised seat or recess 15 in the top of cup 9. The ends of bearing 14 are rounded to conform to the inner walls of seat 15 and opening 13, but engagement of a cooperating shoulder 16 in the cup 15 and a recess 17 in the bearing itself prevents relative rotation. The bearing is of the sleeve type and is made of porous material through which lubricating oil can pass. Around it, above and below the dividing plate 11, are positioned rings 18 and 19 of lubricant absorbing and retaining material such as felt or cellulose wadding. The upper ring 18 and the lower ring 19 are connected through being in contact at the openings 12 in the dividing plate 11, the two rings being compressed to such an extent that they are in contact at those points.

The lower cup 10 of the bearing is centrally formed with an aperture 20, the edge of which slopes upwardly to form an enclosing ring around the inner edge of the ring 19. The diameter of aperture 20 is greater than the inner diameter of bearing 14 for a purpose which will be explained.

Figure 4:
Figure 4 is a view in perspective of the collar which is carried by the supported shaft and which collects escaped lubricating oil and returns it by centrifugal force to the surrounding lubricating-carrying means.

As illustrated in Figure 1 the motor shaft 5 is seated within the bearing 7 and more specifically within the sleeve bearing proper 14. Upon the shaft immediately below the bearing and with its upper end extended into the cup 10 is a collar 21 best illustrated in Figure 4. Collar 21 is non-rotatably mounted upon shaft 5 and its upper end is sloped outwardly, as clearly illustrated in Figures 1 and 4. The upper edge of collar 21 extends above opening 20 in cup 10 and opposite the side wall of lower absorbent ring 19.

Upon the rotation of the motor the shaft rotates in its bearing 14 carrying with it the collar 21. The bearing is, of course, lubricated with suitable lubricating oil which is positioned between the faces of the bearing and the shaft, with a residue and surplus positioned within the retaining and carrying rings 18 and 19. In the operation a certain amount of oil will escape from the contacting faces of the bearing and the shaft, the shaft being vertical, will pass downwardly into the enclosing collar 21. As the collar is sealed to the shaft the oil cannot pass and will be moved by centrifugal force to the periphery of the collar and then be thrown outwardly into contact with the surrounding and inner wall of oil-absorbing ring 19 where it will be absorbed. The oil will then be returned to the upper ring 18, being diffused through the apertures 12, 12 of plate 11, as needed by that ring to supply the sleeve bearing 14.

The bearing construction is quite simple and is adapted to be used in a plurality of positions. Openings 22, 22 are provided at circumferentially spaced points around the flanges of the cups 9 and 10 which permit the unit to be secured removably by screws 23 to the motor frame 2 or to any suitable support to which it is desired to connect the bearings.

It is to be understood that the described embodiment of the invention is only illustrative and that all variations thereof falling within the purview of the following claims are to be considered as falling within the scope of the invention.

What is claimed is:

1. A bearing construction comprising a housing, a porous sleeve bearing seated in said housing, oil retaining means carried by said housing extending circumferentially around said bearing to feed oil directly thereto and extended beyond one end thereof, the portions of said means around said bearing and beyond the end thereof being interconnected in order that oil can pass therebetween, the portion of said means beyond the end of said bearing being adapted directly to receive all the centrifugally thrown oil escaped from said bearing, and means rotatable relative to said retaining means to throw oil centrifugally thereto.

2. A unitary bearing construction forming a separate unit detachable and salable as such, and comprising a housing apertured to receive a rotating shaft, a sleeve bearing positioned in said housing with its axis extended through said aperture, oil-retaining means circumferentially encircling said bearing, oil-retaining means connected to said first mentioned means and positioned between said bearing and said aperture and adapted to enclose in spaced relationship a shaft seated in said bearing and to receive oil thrown centrifugally therefrom.

3. A unitary bearing construction forming a separate unit, detachable and salable as such, and comprising a housing formed with a shaft-receiving aperture, a sleeve bearing positioned in said housing with its adjacent end spaced from said aperture, and oil-retaining-and-feeding absorbent rings in said housing enclosing said bearing and extended at one end thereof between said bearing and said shaft-receiving opening, and being adapted to enclose in spaced relationship a shaft extended through said aperture and seated in said bearing.

4. A unitary bearing construction comprising a housing having a side wall and formed with a shaft-receiving opening, a plate dividing said housing, a sleeve bearing seated between and supported by said plate and the side wall of said housing opposite said aperture, interconnected oil-retaining-and-feeding means upon opposite sides of said plate, the means enclosing said bearing upon one side of said plate and forming a receptacle for all the centrifugally thrown oil upon the opposite side thereof.

5. A bearing construction comprising a divided housing having a side wall, a foraminous plate extended across said housing at the division therein, a sleeve bearing seated between and supported by the side wall of said housing and said plate, a ring of oil absorbent material enclosing said bearing, a second ring of oil absorbent material upon the opposite side of said plate therefrom and interconnected thereto through the openings in said plate being extended beyond the end of said bearing and being adapted to receive centrifugally thrown oil from a rotating shaft seated in said bearing, the wall of said housing adjacent said second ring being formed with a shaft-receiving opening.

6. In combination in a bearing construction and a rotatable shaft mounted therein, a housing apertured to receive a shaft, a bearing in said housing spaced from said aperture, a shaft extended through said aperture and rotatably seated in said bearing, and oil-retaining-and-feeding absorbing means enclosing said bearing and said shaft at the end of said bearing, the means at the end of said bearing being adapted to receive directly all the oil thrown centrifugally from said shaft and to feed it to said means enclosing said bearing, said shaft being provided with means to throw oil centrifugally.

7. In combination in a bearing construction and a rotatable shaft mounted therein, a housing apertured to receive a shaft, a bearing in said housing spaced from said aperture, a shaft extended through said aperture and rotatably seated in said bearing, and oil-retaining-and-feeding absorbing means enclosing said bearing and said shaft at the end of said bearing, circumferentially exposed means to limit the passage of oil along said shaft to a point opposite said means at the end of said bearing to permit the oil to be thrown centrifugally upon shaft rotation, the oil-retaining-and-feeding means at the end of said bearing being adapted to receive all of the oil thrown centrifugally from said shaft and to feed it to said means enclosing said bearing.

8. In combination in a vertical shaft and a bearing construction therefor, a vertical shaft, a bearing housing enclosing the upper end of said shaft, a bearing in said housing rotatably seating said shaft, lubricating means enclosing said bearing and encircling said shaft below said bearing, and an oil cup with radially extended sides carried by said shaft below said bearing and within said lubricating means and adapted to throw oil from said bearing under centrifugal force onto said lubricating means.

9. In combination in a vertical shaft and a bearing construction therefor, a vertical shaft, a bearing housing enclosing said shaft, a bearing in said housing rotatably seating said shaft, lubricating means to feed oil directly to said bearing, a lubricant-receiving-and-transmitting absorbent ring in said housing and enclosing said shaft in spaced relationship below said bearing, and a lubricant thrower on said shaft within said ring to throw lubricant from said shaft to said ring.

10. In combination in a vertical shaft and a bearing construction therefor, a vertical shaft, a bearing housing enclosing said shaft, a porous sleeve bearing in said housing rotatably seating said shaft, a lubricating ring of absorbent material encircling said bearing in contact therewith, a second oil ring in contact with said first-mentioned oil ring encircling said shaft in spaced relationship below said bearing, and an oil cup on said shaft within said second ring adapted to receive oil escaping downwardly on said shaft from said bearing and provided with a peripheral escape to permit oil to be thrown centrifugally to said second ring upon the rotation of said shaft.

11. In combination in a vertical shaft and a bearing construction therefor, a vertical shaft, a bearing housing enclosing said shaft, a porous sleeve bearing in said housing rotatably seating said shaft, a sleeve-like body of lubricating absorbent material in said housing encircling said bearing in contact therewith and extended therebelow in spaced relationship to said shaft, and an oil cup on said shaft within said body below said bearing to receive oil escaping downwardly on said shaft on said bearing and formed with a peripheral escape to permit oil to be thrown centrifugally to said body upon the rotation of said shaft.

UNCAS A. WHITAKER.